INVENTOR
THOMAS M. DAUPHINEE
BY Smart & Biggar
ATTORNEYS.

INVENTOR
THOMAS M. DAUPHINEE
BY Smart & Biggar
ATTORNEYS.

INVENTOR
THOMAS M. DAUPHINEE
BY Smart & Biggar
ATTORNEYS.

3,065,418
VERNIER POTENTIOMETER
Thomas M. Dauphinee, Ottawa, Ontario, Canada, assignor to National Research Council, Ottawa, Ontario, Canada
Filed Jan. 4, 1960, Ser. No. 242
6 Claims. (Cl. 324—98)

This invention relates to a vernier potentiometer capable of measuring unknown voltages to six significant figures.

Vernier potentiometers are well known in the prior art but the construction of a potentiometer readable to six figures and capable of measuring low voltages, say to $\frac{1}{10}$ of a micro-volt, presents major problems if the readings are to be reproducible and accurately known.

A major source of error is introduced by the changes of resistances of current-carrying switches which are located between the points of connection of the potential terminals or which otherwise affect the current distribution in the potentiometer network. This source of error can only be eliminated by making switch resistance variation negligibly small. The permissible variation in resistance at the switch contacts depends upon the particular circuit involved, but there has been great difficulty in developing circuits with reasonable switch requirements which are not unstable for other reasons.

Another source of error in measuring very small voltages occurs as a result of deviations from the nominal value of the resistors used in measuring networks. These changes may be caused by temperature variations, by permanent changes in resistance resulting from aging or strains in the wire, or by inaccuracies in the original adjustment of the resistors. If all of the coils of an instrument change identically, no error results, but it is quite unreasonable to expect that this will occur to six significant figures. As a result, some form of calibration will usually be necessary, and should be available, if only for checking purposes. Since it is unlikely that another instrument of sufficient precision will be available to effect the calibration, autocalibration, that is, intercomparison of coils of the instrument itself, is preferable. With decade type instruments, autocalibration is relatively accurate, since each of the 10 resistors of the decade is being compared with the whole of the next lower decade. However, if a 100 step dial is used in place of the decade arrangement, a special problem is presented, since the accumulated error over 100 steps becomes undesirably large. Autocalibration in, say, 10 groups of 10 steps each is desirable, but no simple system has appeared to date.

Thermal electromotive forces in switches and leads, or across the resistors, introduce a third source of error. Thermal electromotive forces in switches are likely to be relatively large at the moment of operation, due to friction heating, but usually die away exponentially to a small, but not necessarily negligible, value quite soon thereafter. Thermal electromotive forces in the wiring of the instrument may be prevented by ensuring uniformity of temperature throughout, by using materials with low thermoelectric power relative to one another and by making joints between dissimilar metals in pairs in such a way that residual thermal electromotive forces tend to cancel out. However, in the prior art vernier potentiometers, the operating switches are in series with the measuring circuit so that their thermal electromotive forces, including those of the last operated switch, are directly introduced into the measurement. In a partially successful attempt to overcome this fault, some potentiometers may be oil filled to reduce heating in operation and to carry the heat away quickly.

In my invention, a vernier potentiometer comprises a first series circuit including a source of direct current and a rheostat for varying this current, first and second tapped resistance elements and a fixed resistance element. A second series circuit is composed of a fixed proportion of the first tapped resistance element variably situated therealong, a first current limiting resistor and a variable portion of a third tapped resistance element. Similarly, a third series circuit is composed of a fixed proportion of said second tapped resistance element variably situated therealong, a second circuit limiting resistor and a variable portion of a fourth tapped resistance element. A first galvanometer and a pair of terminals adapted to be connected to a second source of direct current are connected in series across the combination of the third and fourth tapped resistance elements. A standard cell and a second galvanometer are connected in series across the fixed resistance. The standard cell and the first source of direct current have the same polarity relative to the fixed resistance. In addition, a switching means comprising a plurality of pairs of terminals is provided. One pair of the terminals is adapted to be connected to the second source of direct current and the first current sensing device which are connected in series. A plurality of reference resistance elements and the four mentioned tapped resistance elements are connected in different combinations across the remainder of the terminal pairs. One of the combinations includes a specified one of the tapped resistance elements wherein a specified group of taps is to be tested.

One advantage obtained by my invention is that the switch resistance is less critical than in potentiometer circuits known in the prior art. This occurs as a result of the fact that the current carried through each of the switch contacts is reduced by a large factor. This means that the switch resistances can be much greater, and still not cause a critically large voltage drop across the contacts. In a practical application of my circuits, the switch stability requirements have been reduced from $2 \times 10^{-5}$ ohms for the usual six figure instrument to $5 \times 10^{-3}$ ohms with fewer switch contacts in direct series with the current sensing element. The switch tolerances of this circuit are such that a six figure instrument can have a safety factor in the switches of at least 25 over a comparable five figure instrument of conventional design and special switch considerations are therefore completely unnecessary.

Another advantage of my invention is that it has proved quite easy to make provisions for autocalibration of dials in subgroups of four or five resistors for the first resistance element and 10 for the second and third resistance elements, thus providing a number of "fixing" points along the resistance elements which greatly reduce the probability of accumulative errors in the calibration.

Another advantage of my invention is that only two of the switch contacts are in series with the current sensing element and the second source of voltage. Since these are the first operated switches, any thermal electromotive forces developed during their operation should have died out by the time a balance of the last two resistance elements is achieved. All other contacts are so located in the circuit that thermal electromotive forces are attenuated to negligible values.

My invention will be further described with reference to the accompanying drawings in which.

Figure 1:
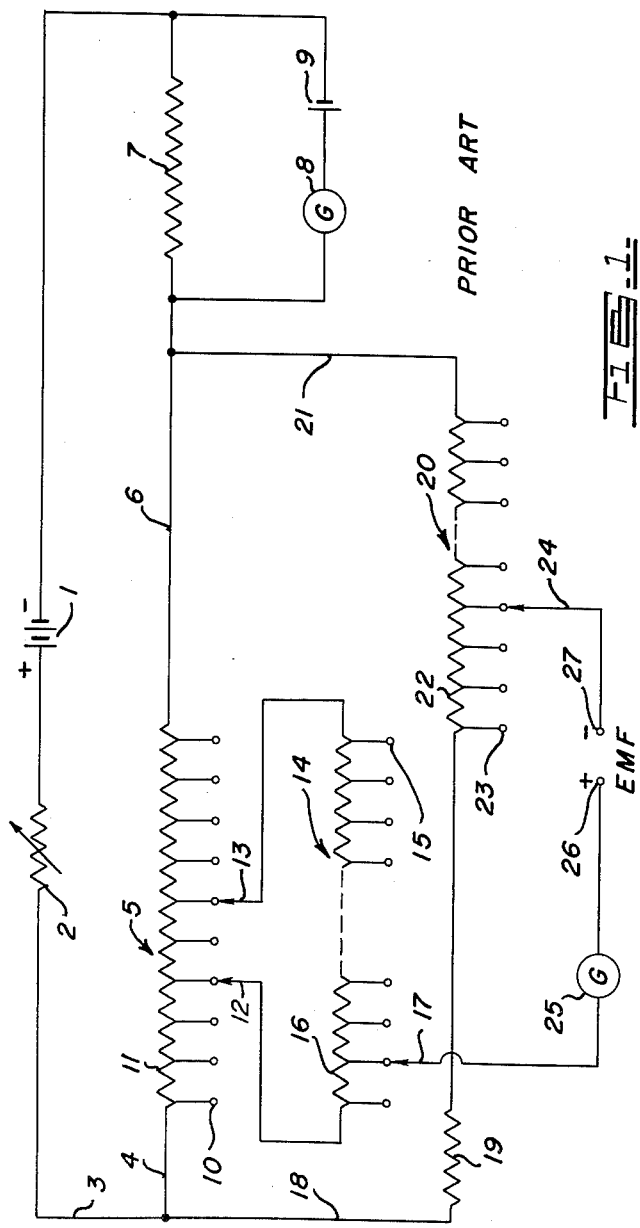
FIGURE 1 is a schematic diagram of a vernier potentiometer known in the prior art.

FIGURE 1 is a schematic circuit diagram of a six figure vernier potentiometer known in the prior art in which the source of direct current 1 is connected in series with a current controlling rheostat 2. Through conductors 3 and 4, this combination is connected in series with a first tapped resistance element 5 and thence through conductor 6 to a fixed resistance element 7 which completes the circuit to the negative terminal of the direct current source 1. A balancing galvanometer 8 and a standard cell 9 are connected in series across the terminals of the fixed resistance element 7. The first tapped resistance element 5 is made up of a series of individual equal resistors 11 having resistance taps 10 along which sliding contacts 12 and 13 are adapted to be moved. Contacts 12 and 13 are in fixed spaced relation to each other, the spacing being equivalent to two of the resistors of the first tapped resistance element 5. A second tapped resistance element 14 having a resistance equal to the sum of two individual resistors 11 of first tapped resistance element 5 is connected between the contacts 12 and 13. The second tapped resistance element 14 is comprised of a series of resistors 16 having taps 15 along which a contact 17 is adapted to move. Connected in parallel with the first tapped resistance element 5 is a third tapped resistance element 20. The parallel circuit is composed of a conductor 18, a current limiting resistor 19, a third tapped resistance element 20 and a conductor 21. The third tapped resistance element 20 is made up of a series of resistors 22 having individual taps 23 along which a contact 24 is adapted to move. Between moving contacts 17 and 24, a balancing galvanometer 25 and a pair of terminals 26 and 27 are connected in series. A second source of direct current, whose value is to be determined, is connected across the terminals 26 and 27.

In operation, current flowing from the direct current source 1 is controlled by the rheostat 2 and flows through conductor 3, then dividing between conductors 4 and 18. Because of the presence of the current limiting resistor 19 in conductor 18, the amount of current carried by this circuit is much less than that carried through conductor 4 and the first and second tapped resistance elements 5 and 14, respectively. The current in conductor 4 divides equally between the particular resistor 11 and the second tapped resistance element 14 which are connected in parallel. Since the current flowing in this part of the circuit is relatively large, the resistance at the contacts 12 and 13 must be extremely small to prevent a relatively large voltage drop from appearing across these contacts. Using the first tapped resistance element 5, the contacts 12 and 13 are moved from left to right to increase the voltage appearing at contact 17. Since the sum of the resistances 16 in the second tapped resistance element 14 is equal to the sum of the resistances 11 of the first tapped resistance element 5 which are bridged by the sliding contacts 12 and 13, the sliding contact 17 moving along the second resistance element taps 15 may vary the voltage by an amount no greater than that appearing between the contacts 12 and 13.

The remainder of the current from conductor 3 flows through the conductor 18 and the current limiting resistor 19 to the third tapped resistance element 20 where a voltage is selected depending upon the position of a sliding contact 24 along a series of taps 23, the voltage selected being larger as the contact 24 is displaced from left to right. Inititally, the standard cell 9 is introduced in the circuit and a balance is obtained using the galvanometer 8. Maintaining the constant current from the first source of direct current 1, a second source of direct current whose value is to be determined is introduced between the terminals 26 and 27 and the first, second, and third resistance elements 5, 14 and 20 respectively are adjusted in that order until galvanometer 25 indicates that balance has been achieved, whereupon the value of the unknown voltage may be determined from the settings of the tapped resistance elements and the value of the current flowing from the direct current source 1. It will be appreciated that the accuracy of this determination is dependent upon the stability of the resistance in the galvanometer circuit which includes the resistance at contacts 12 and 13 and that since these contacts carry a large proportion of the current flowing from the direct current source 1 the source of error produced becomes much more important as the accuracy of the measurement of the unknown source of voltage becomes greater.

Figure 2:
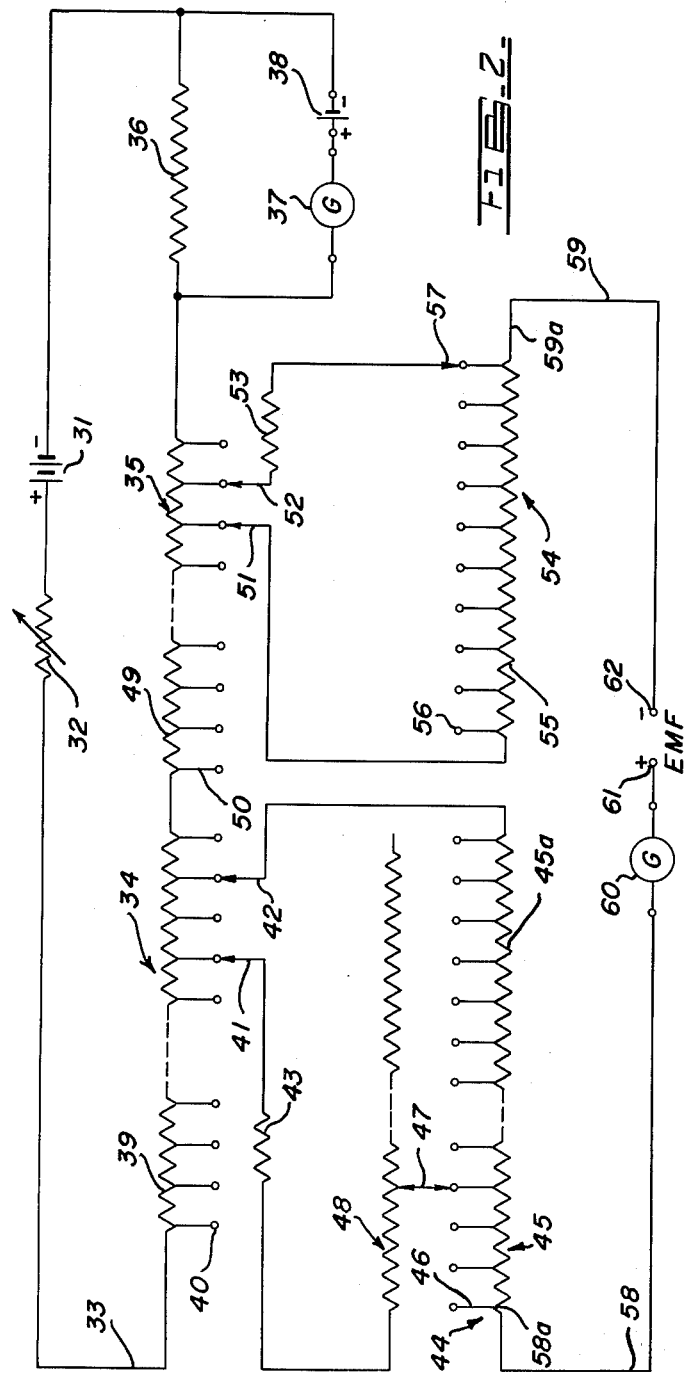
FIGURE 2 is a schematic diagram of a vernier potentiometer according to my invention.

FIGURE 2 is a schematic diagram of a six figure vernier potentiometer according to my invention, in which a first source of direct current 31 is connected in series with a rheostat 32, a conductor 33, a first tapped resistance element 34, a second tapped resistance element 35, and a fixed resistance element 36 to complete the circuit to the negative terminal of the direct current source 31. The terminals of a galvanometer 37 and of a standard cell 38 are connected in series across the fixed resistance 36 such that the polarities of the standard cell 38 and the first direct current source 31 are the same relative to the fixed resistance 36. The first tapped resistance element 34 is composed of a series of equal resistances 39 having equally spaced taps 40 along which contacts 41 and 42 are adapted to slide. Contacts 41 and 42 are in fixed spatial relation with each other, the spacing being a distance equal to that between two taps 40 separated by the two connected resistances 39 of the first tapped resistance element 34. A current limiting resistor 43 is connected in series with the contact 41. A third tapped resistance element 44 is made up of two identical resistors 48 and 45, respectively. A sliding tap 47 is in continous engagement with both of the identical resistors 48 and 45 so that the current through the combination remains constant and independent of the position of contact 47. The resistor 48 is connected in series with current limiting resistor 43 which in turn is connected to the contact 41. The other resistor 45 is connected directly in series with the other contact 42 and is made up of the series of individual identical resistors 45a having taps 46 along which the contact 47 is adapted to slide.

The second tapped resistance element 35 is composed of a series of identical resistors 49 having individual equally spaced taps 50 along which sliding contacts 51 and 52 are adapted to move. Contacts 51 and 52 are in fixed space relation to each other, the spacing being equal to that between two adjacent taps 50 of the second tapped resistance element 35. A current limiting resistor 53 is connected in series with one of the contacts 52. A fourth tapped resistance element 54 is connected in series with the contact 51, the contact 52, and the current limiting resistor 53. The fourth tapped resistance element 54 is made up of a series of identical resistors 55 having taps 56 along which a contact 57 is adapted to move.

One end 58a of the tapped resistance 45 is connected through a conductor 58 to a balancing galvanometer 60 which is in series with terminals 61 and 62 which are adapted to be connected to a second source of direct current whose value is to be determined. These terminals in turn are connected through a conductor 59 to one end 59a of the fourth tapped resistance element 54.

In operation, current from the direct current source 31 is controlled by the rheostat 32. The standard cell 38 is introduced into the circuit and rheostat 32 adjusted until the net current flowing through the galvanometer 37 is zero. The current through galvanometer 37 will be zero when the voltage developed across fixed resistance by current from the direct current source 31 is equal to the voltage of the standard cell 38. Then the second source of direct current whose value is to be determined is introduced across the terminals 61 and 62 with a polarity as indicated and the first, second, third and fourth tapped resistance elements 34, 35, 44 and 54, respectively, are adjusted until the net current flowing through the galvanometer 60 is zero. The current through galvanometer 60 will be zero when the voltage developed across the conductors 58 and 59 is equal, but of opposite polarity to that of the second source of direct current introduced across the terminals 61 and 62. The voltage developed across conductors 58 and 59 is determined by the current from direct current source 31 flowing through the combination of the four tapped resistance elements 34, 35, 44 and 54. The value of the second source of direct current can be determined from the settings of the tapped resistance element and from the known value of current from the direct current source 31.

According to my invention, the first and second tapped resistance elements 34 and 35 are connected directly in series with the first source of direct current 31 and carry by far the larger portion of that current without the need of sliding contacts and the relatively large voltage drop which would occur across such contacts due to the large current. The larger the voltage of the second direct current source introduced across the terminals 61 and 62 the farther the taps 41, 42 must be displaced to the left or the farther the taps 51, 52 must be displaced to the right to balance the galvanometer 60. Because of the presence of current limiting resistors 43 and 53 in series with the third and fourth tapped resistance elements 44 and 54, the current carried by these elements is relatively small and thus, the voltage drops across the contacts 41, 42 and 51, 52 as well as 47 and 57, are so small that the determination of the unknown voltage to six significant figures is possible. After the first and second tapped resistance elements 34 and 35 have been adjusted, the third tapped resistance element 44 is adjusted to introduce increasing voltage by moving the contact 47 from right to left. In the case of the third tapped resistance element 44, the resistor 48 is used to maintain the current constant and so avoid the slight non-linearity of voltage, and change of overall potentiometer current, both of the order of a few parts per million of full scale reading, that would otherwise result as the sliding contact 47 is moved. This refinement is not required for the fourth tapped resistance element 54, which is last adjusted by moving it from left to right to provide increasing voltage.

Figure 3:
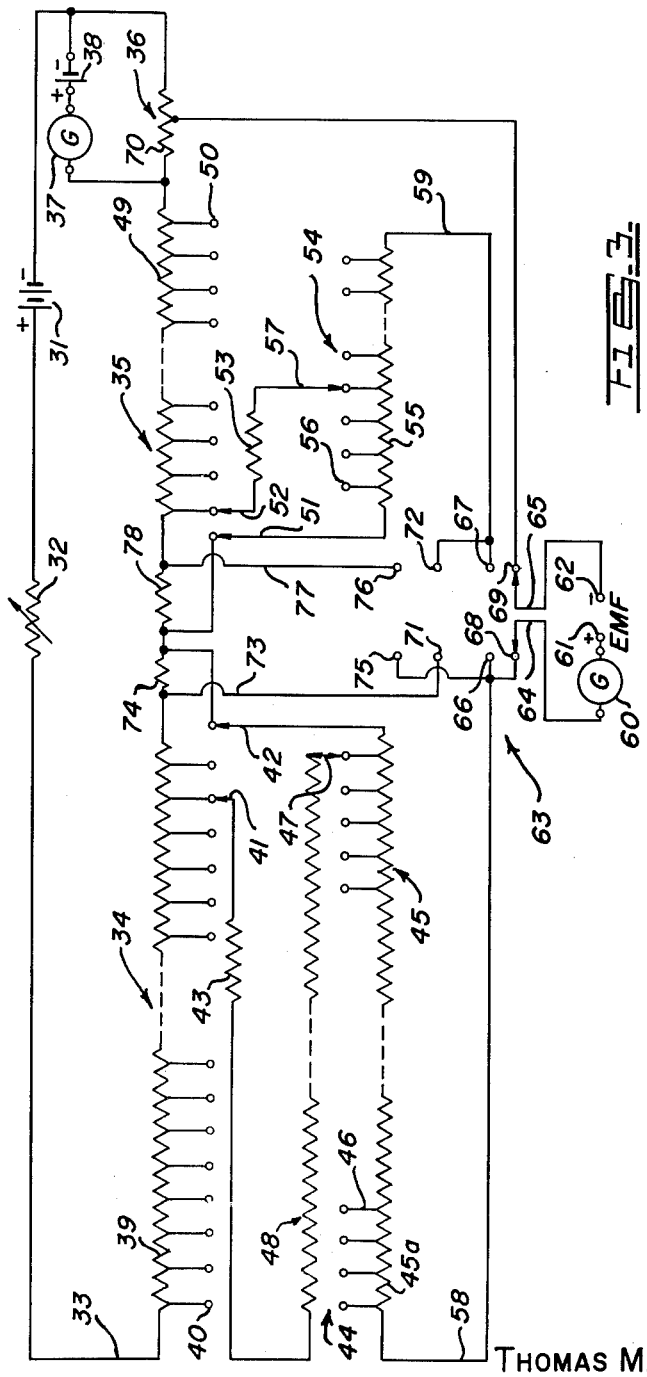
FIGURE 3 is a schematic diagram of a vernier potentiometer having autocalibration means according to my invention.

FIGURE 3 is a schematic diagram of a vernier potentiometer according to my invention incorporating an auto-calibration means. The same potential measuring circuit is used in this figure as in FIGURE 2, and the same numerical designations have been used for like parts in both figures. A multi-contact switch 63 has been introduced into the circuit and the balancing galvanometer 60 and the terminal pair 61, 62 are connected in series across the sliding contacts 64 and 65 of the switch 63. In normal potential measuring operations, the contacts 64 and 65 would be across terminals 66 and 67 which may be considered as the "normal" position of the switch.

For the calibration of the first tapped resistance element 34, the other tapped resistance elements 35, 44, and 54 are set to zero and switch contacts 64 and 65 are first placed across terminals 68 and 69 as shown in FIGURE 3. In this position, a part 70 of fixed resistor 36 and all of the tapped resistance 35 are connected in the circuit, and by varying the current produced by the direct current source 31, using rheostat 32, the galvanometer 60 may be balanced. Switch contacts 64 and 65 are then returned to "normal" terminals 66 and 67 which removes the resistance effect of the second tapped resistance 35 and the part 70 of the fixed resistance 36. While maintaining the current from the direct current source 31 constant, the contacts 41 and 42 are moved from right to left along the first tapped resistance element 34 until the galvanometer 60 indicates that balance has once again been achieved. The value of the resistance of the first tapped resistance element 34 at this point is equivalent to the sum of the second tapped resistance element 35 and the part 70 of the fixed resistance element 36. In a vernier potentiometer of this type which was constructed, resistance 70 was made equal to four of the individual resistances 39 of the first tapped resistance element 34 and the second tapped resistance element 35 was made equal to one resistance 39 of the first tapped resistance element 34, so that when contacts 51 and 52 are in their extreme left hand position as shown in FIGURE 3, five taps of the first resistance element 34 are compared to the sum of the second tapped resistance element 35 and the part 70 of the fixed resistance element 36. However, if the contacts 51 and 52 are moved to their extreme right position then the part 70 of the fixed resistance 36 alone acts as the reference resistor and will be balanced by approximately four taps of the first fixed resistance element 34. By calibrating in groups of four or five, a series of calibration points are obtained along the resistance chain and it is then possible to calibrate the individual resistors 39 located between these points against the whole of the second fixed resistance element 35 acting as the reference resistor.

The calibration of second tapped resistance element 35 is conducted in a similar manner by first connecting sliding contacts 64 and 65 across terminals 71 and 72. In this position a reference resistor 74 which forms part of the first tapped resistance element 34 is introduced into the circuit and balance is obtained on the galvanometer 60 by varying the current from the direct current source 31, using rheostat 32. The contacts 64 and 65 are then switched back to "normal" terminals 66 and 67, and with tapped resistance elements 34, 44, and 54 remaining at zero, the contacts 51 and 52 are moved along the second tapped resistance element 35 until balance is achieved. Final balance is carried out as before. In a properly constructed instrument the difference will never be more than a few steps in the last dial. In the potentiometer as constructed, where the second tapped resistance element 35 was composed of 100 identical resistance steps formed by resistors 49, the reference resistor 74 was made equivalent to 10 of the resistors 49, and in this way, 10 calibration points were obtained along the tapped resistance 35. Each of the individual resistors 49 between the established reference points were then individually compared against the whole of the third tapped resistance element 44 which acted as a reference resistor equivalent to a single resistance 49 in the second tapped resistance element 35.

A similar method is used to calibrate the third tapped resistance element 44. Sliding contacts 64 and 65 of switch 63 are placed across terminals 75 and 76 which introduces a reference resistor 78 into the balancing circuit. In the potentiometer as constructed, the reference resistor 78 was equivalent to 10 of the individual resistances 45a which forms part of the 100 tapped resistance 45. As discussed previously, the 10 calibration points were obtained along the tapped resistance element 44 and then the individual resistors 45a located between these points were compared with the whole of the fourth tapped resistance element 54 which acted as the reference resistor.

What I claim as my invention is:

1. A vernier potentiometer comprising: a first series circuit composed of a source of direct current, a rheostat, first and second tapped resistances, and a fixed resistance; a second series circuit composed of a fixed proportion of said first tapped resistance element variably situated therealong, a first current limiting resistor and a variable portion of a third tapped resistance element; a third series circuit composed of a fixed proportion of said second tapped resistance element variably situated therealong, a second current limiting resistor and a variable portion of a fourth tapped resistance element; a first galvanometer and a pair of terminals adapted to be connected to a second source of direct current connected in series across the combination of said third and fourth tapped resistance elements; a standard cell and a second galvanometer connected in series across said fixed resistance, said standard cell and first direct current source having the same polarity relative to said fixed resistance.

2. A vernier potentiometer according to claim 1, in which said first tapped resistance element is composed of a series of identical resistances of one value and said second tapped resistance element is composed of a series of identical resistances of another value, said identical resistances being separated in each case by equally spaced taps; said fixed proportions of the tapped resistance elements being composed of a specified number of consecutive identical resistances in each case, said specified number being determined by the sliding engagement of a pair of contacts with said taps in each case, said contacts being in fixed space relation to each other.

3. A vernier potentiometer according to claim 2 in which said third tapped resistance element is composed of two equal resistors with a single slidable contact engaging both of said resistors, one of said identical resistors being connected in series with said first current limiting resistor to one of the pair of contacts connecting said first and third resistance being elements, the other of said identical resistors connected at one end to the other contact of that pair.

4. A vernier potentiometer according to claim 2 in which said fourth tapped resistance element is composed of a single resistor having a sliding contact, said single resistor being connected in series with said second current limiting resistor to one of the pair of contacts connecting said second and fourth resistance elements and the sliding contact of said single resistor being connected to the other contact of that pair.

5. A vernier potentiometer according to claim 1 including switching means comprising a plurality of pairs of terminals, each of said pairs of terminals being adapted to be connected to said second source of direct current and said first galvanometer connected in series, a plurality of reference resistance elements, different combinations of said tapped resistance elements and reference resistance elements being connected across the remainder of said pairs of terminals, one of said combinations including one of said tapped resistance elements wherein a predetermined group of taps is to be tested.

6. A vernier potentiometer according to claim 5 in which said plurality of reference resistance elements comprises first, second and third reference resistors, said first reference resistor being composed of a section of said fixed resitance element, the sum of the resistance values of said section of said fixed resistance element and of said second tapped resistance element being equivalent to the total resistance of five taps of said first tapped resistance element, said second reference resistor equivalent to ten taps of said second tapped resistance element, and said third reference resistor equivalent to ten taps of said third tapped resistance element.

References Cited in the file of this patent

Publication: "A Switch-Dial Potentiometer Divider," by W. K. Clothier in Journal of Scientific Instruments, vol. 33, May 1956 at pages 196–198.